(12) United States Patent
Georgin et al.

(10) Patent No.: US 10,752,230 B2
(45) Date of Patent: Aug. 25, 2020

(54) PROGNOSTICS FOR PRESSURE SENSORS OF HYDRAULIC BRAKE SYSTEMS

(71) Applicant: GOODRICH CORPORATION, Charlotte, NC (US)

(72) Inventors: Marc Georgin, Dayton, OH (US); Michael Kordik, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 446 days.

(21) Appl. No.: 15/884,177

(22) Filed: Jan. 30, 2018

(65) Prior Publication Data
US 2019/0232937 A1 Aug. 1, 2019

(51) Int. Cl.
| | |
|---|---|
| *B60T 17/22* | (2006.01) |
| *B60T 8/17* | (2006.01) |
| *B60T 8/172* | (2006.01) |
| *B60T 15/02* | (2006.01) |
| *G07C 5/00* | (2006.01) |
| *G07C 5/08* | (2006.01) |
| *B64C 25/42* | (2006.01) |
| *B60T 8/88* | (2006.01) |

(52) U.S. Cl.
CPC ............ *B60T 17/221* (2013.01); *B60T 8/172* (2013.01); *B60T 8/1703* (2013.01); *B60T 8/885* (2013.01); *B60T 15/028* (2013.01); *B64C 25/42* (2013.01); *G07C 5/006* (2013.01); *G07C 5/0808* (2013.01); *B60T 2270/406* (2013.01)

(58) Field of Classification Search
CPC ...... B60T 17/22; B60T 17/221; B60T 15/025; B60T 15/027; B60T 15/028; B60T 15/04; B60T 15/041; B60T 15/043; B60T 2270/406; B60W 2050/0215; G05B 2219/42329; G05B 2219/14039
See application file for complete search history.

(56) References Cited

U.S. PATENT DOCUMENTS

| | | |
|---|---|---|
| 6,390,571 B1 | 5/2002 | Murohy |
| 9,771,057 B2 | 9/2017 | Georgin et al. |

(Continued)

FOREIGN PATENT DOCUMENTS

| | | |
|---|---|---|
| JP | H11278228 | 10/1999 |

OTHER PUBLICATIONS

European Patent Office, European Search Report dated Oct. 8, 2019 in Application No. 19154560.7.

*Primary Examiner* — Thomas G Black
*Assistant Examiner* — Sara J Lewandroski
(74) *Attorney, Agent, or Firm* — Snell & Wilmer L.L.P.

(57) ABSTRACT

A method of performing prognostics on a hydraulic brake system of an aircraft may include determining, during primary braking mode and by a hydraulic brake controller, a first status of a first brake pressure sensor adjacent a brake assembly. The method may also include, in response to determining that the first status of the first brake pressure sensor is valid, determining, during park braking mode and by the hydraulic brake controller, a second status of a second brake pressure sensor adjacent a park valve assembly. In response to determining that the first status of the first brake pressure sensor is degraded, the method may include outputting, by the hydraulic brake controller, at least one of an inspection indicator and a maintenance indicator.

20 Claims, 5 Drawing Sheets

(56) References Cited

U.S. PATENT DOCUMENTS

| | | | |
|---|---|---|---|
| 2006/0163939 A1* | 7/2006 | Kuramochi | B60T 13/741 303/122.04 |
| 2008/0078631 A1* | 4/2008 | Erlston | B60L 50/16 188/159 |
| 2010/0228430 A1* | 9/2010 | Cahill | B60T 8/885 701/29.2 |
| 2013/0230075 A1* | 9/2013 | Selles | B64C 25/42 374/141 |
| 2015/0142386 A1* | 5/2015 | Vaucher | B60W 50/04 702/183 |
| 2017/0008503 A1* | 1/2017 | Romana | B60T 17/221 |
| 2017/0183087 A1 | 6/2017 | Georgin et al. | |
| 2017/0243413 A1* | 8/2017 | Haggerty | G07C 5/0808 |
| 2018/0111622 A1* | 4/2018 | Malone | B60T 8/172 |
| 2018/0208300 A1* | 7/2018 | Bill | B60T 8/885 |
| 2020/0114893 A1* | 4/2020 | Kim | B60T 13/662 |

* cited by examiner

PROGNOSTICS FOR PRESSURE SENSORS OF HYDRAULIC BRAKE SYSTEMS

FIELD

The present disclosure relates to aircraft systems, and more specifically, to hydraulic brake control systems.

BACKGROUND

Aircraft typically have brakes on the wheels to slow the aircraft during aborted takeoffs, landings, and/or while taxiing. Additionally, aircraft generally employ hydraulic park brake systems that are capable of maintaining a braking force while the aircraft is parked. Generally, hydraulic brake systems utilize multiple brake pressure sensors that provide feedback to the control architecture. However, if one or more of the brake pressure sensors fails, the integrity of the control architecture may be compromised, thus requiring an inconvenient and potentially time-consuming inspection/repair. Such failed brake pressure sensors may require immediate attention, which can result in the aircraft being removed from operation for an unscheduled inspection/repair, thereby contributing to flight delays and lost profits.

SUMMARY

In various embodiments, the present disclosure provides a method of performing prognostics on a hydraulic brake system of an aircraft. The method may include determining, during primary braking mode and by a hydraulic brake controller, a first status of a first brake pressure sensor adjacent a brake assembly. The method may also include, in response to determining that the first status of the first brake pressure sensor is valid, determining, during park braking mode and by the hydraulic brake controller, a second status of a second brake pressure sensor adjacent a park valve assembly.

In various embodiments, in response to determining that the first status of the first brake pressure sensor is degraded, the method also includes outputting, by the hydraulic brake controller, at least one of an inspection indicator and a maintenance indicator. In various embodiments, the first brake pressure sensor is coupled to a first hydraulic line extending between a shuttle valve and the brake assembly. The second brake pressure sensor may be upstream of the shuttle valve. The second brake pressure sensor may be coupled to a second hydraulic line extending between the park valve assembly and the shuttle valve.

In various embodiments, in response to determining that the second status of the second brake pressure sensor is degraded, the method may include determining, by the hydraulic brake controller, an extent-of-degradation condition of the second brake pressure sensor. The extent-of-degradation condition is predictive of when the second brake pressure sensor will fail, according to various embodiments. The method may further include determining, based on the extent-of-degradation condition and by the hydraulic brake controller, a timeline for at least one of inspecting and performing maintenance on the second brake pressure sensor. In various embodiments, determining the extent-of-degradation condition includes comparing a difference between a validated pressure from the first pressure sensor and a reported pressure from the second brake pressure sensor. Determining the extent-of-degradation condition may include determining a rate of change of the difference between the validated pressure from the first pressure sensor and the reported pressure from the second brake pressure sensor.

In various embodiments, determining the first status of the first brake pressure sensor includes comparing, by the hydraulic brake controller, a reported pressure from the first brake pressure sensor with an expected pressure. The expected pressure may be based on an electrical-current-to-pressure response of a servo valve.

Also disclosed herein, according to various embodiments, is a hydraulic brake system for an aircraft. The hydraulic brake system may include a primary user input interface and a primary valve assembly in electronic control communication with the primary user input interface via a hydraulic brake controller. The hydraulic brake system may also include a park valve assembly in mechanical control communication with a park user input interface. A shuttle valve may be disposed in hydraulic communication between the primary valve assembly and the park valve assembly, and a brake assembly may be coupled to landing gear of the aircraft and disposed downstream of and in hydraulic communication with the shuttle valve. In various embodiments, a first brake pressure sensor is coupled between the shuttle valve and the brake assembly and a second brake pressure sensor is coupled between the park valve assembly and the shuttle valve. The hydraulic brake controller may have a processor. The system may also include a tangible, non-transitory memory configured to communicate with the processor, the tangible, non-transitory memory having instructions stored thereon that, in response to execution by the processor, cause the hydraulic brake system to perform various operations. The various operations may include determining, by the processor and during primary braking mode, a first status of the first brake pressure sensor and, in response to determining that the first status of the first brake pressure sensor is valid, determining, by the processor and during park braking mode, a second status of the second brake pressure sensor.

Also disclosed herein, according to various embodiments, is a method of performing prognostics on a hydraulic brake system of an aircraft. The method may include determining, during park braking mode and by a hydraulic brake controller, a second status of a second brake pressure sensor that is coupled to a second hydraulic line extending between a park valve assembly and a shuttle valve. The method may also include, in response to determining that the second status of the second brake pressure sensor is valid, determining, during primary braking mode and by the hydraulic brake controller, a first status of a first brake pressure sensor that is coupled to a first hydraulic line extending between the shuttle valve and a brake assembly.

In various embodiments, in response to determining that the second status of the second brake pressure sensor is degraded, the various operations may include outputting, by the hydraulic brake controller, at least one of an inspection indicator and a maintenance indicator. In various embodiments, in response to determining that the first status of the first brake pressure sensor is degraded, the method may include determining, by the hydraulic brake controller, an extent-of-degradation condition of the first brake pressure sensor. The extent-of-degradation condition may be predictive of when the first brake pressure sensor will fail. The method may include determining, based on the extent-of-degradation condition and by the hydraulic brake controller, a timeline for at least one of inspecting and performing maintenance on the first brake pressure sensor. Determining the extent-of-degradation condition may include comparing a difference between a validated pressure from the second brake pressure sensor and a reported pressure from the first pressure sensor. Determining the second status of the second brake pressure sensor may include comparing, by the hydraulic brake controller, a reported pressure from the second brake pressure sensor with an expected pressure, wherein the expected pressure is based on a position-to-pressure response of a displacement sensor.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
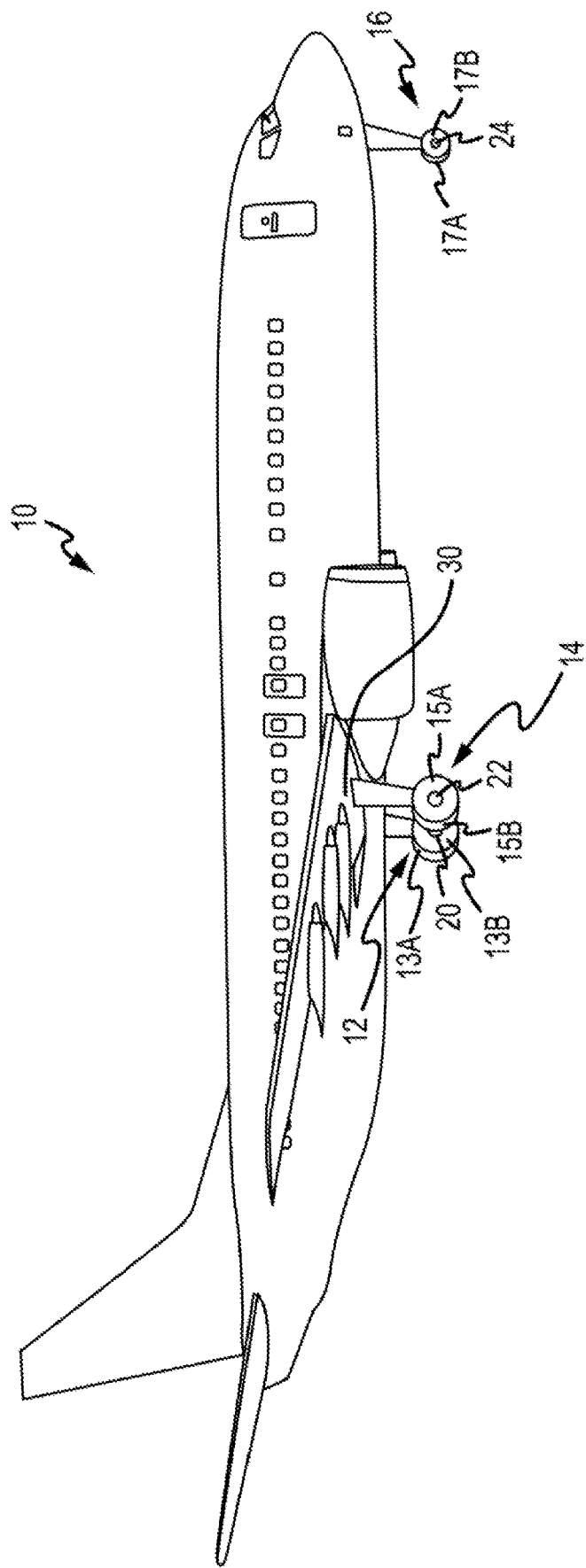
FIG. 1 illustrates an exemplary aircraft having a hydraulic brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft 10 may also include a brake assembly, which may be coupled to a landing gear of the aircraft 10 and configured to control braking at the wheels of the landing gear. The brake assembly may be controlled by a hydraulic brake system of aircraft 10, which may include a collection of subsystems that produce output signals for controlling the braking force and/or torque applied at each wheel (e.g., wheel 13A, wheel 13B, wheel 15A, wheel 15B, etc. wheel 17A, and/or wheel 17B). The hydraulic brake system may communicate with the brake assemblies of each landing gear (e.g., main landing gear 12, main landing gear 14, and/or nose landing gear 16), and each brake assembly may be mounted to each wheel to apply and release braking force on one or more wheels (e.g., as described above).

The brakes of an aircraft 10 may include a non-rotatable wheel support, a wheel (e.g., wheel 13A, wheel 13B, wheel 15A, wheel 15B, wheel 17A, and/or wheel 17B) mounted to the wheel support for rotation, and a brake disk stack. The brake stack may have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be hydraulically operated actuator rams, although brakes in various embodiments may use pneumatically or electrically operated actuator rams.

Figure 2:
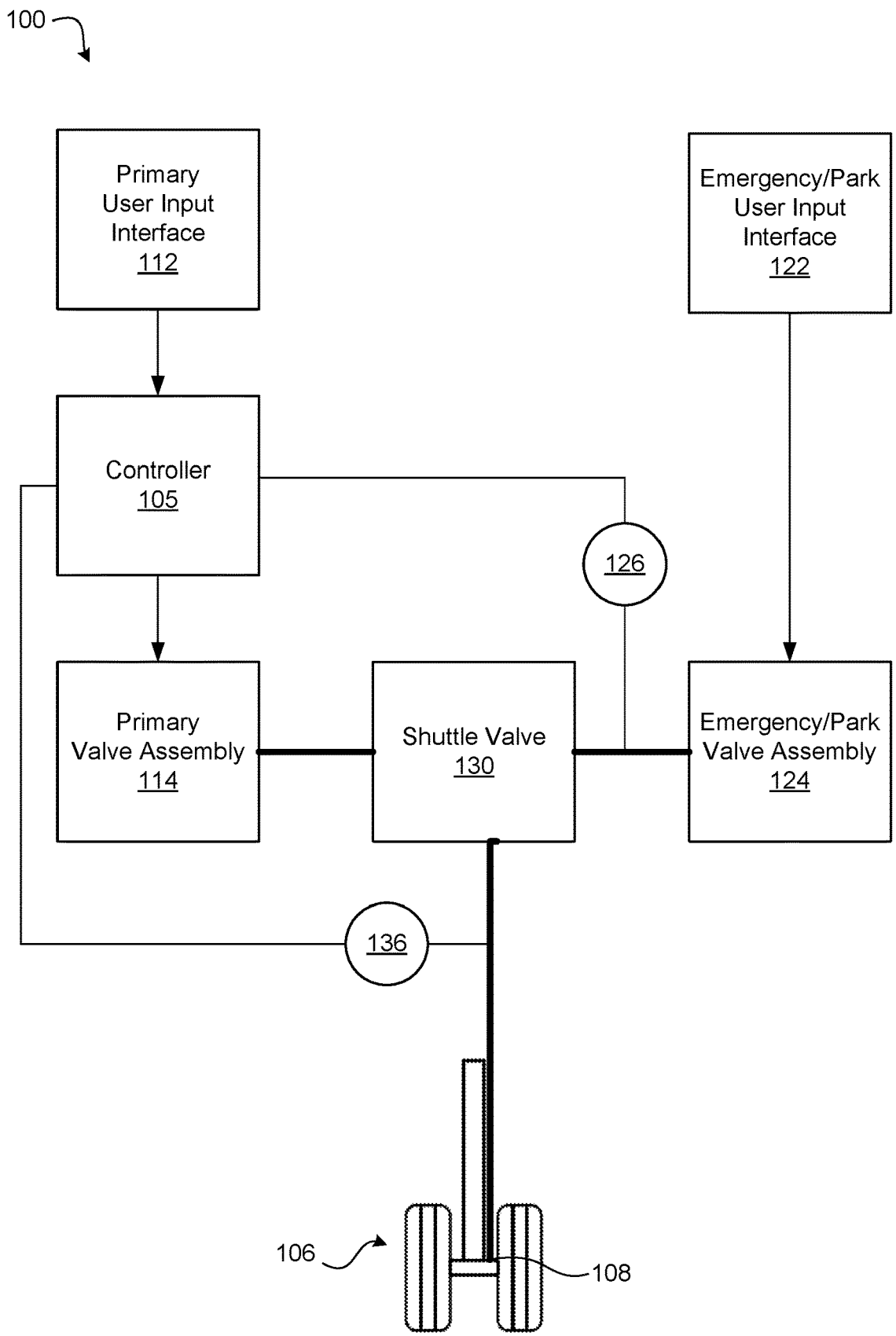
FIG. 2 illustrates a schematic of a hydraulic brake system, in accordance with various embodiments.

In various embodiments, and with reference to FIG. 2, a hydraulic brake system 100 of aircraft 10 is provided. The hydraulic brake system 100 may include user input interfaces 112, 122, a controller 105, valve assemblies 114, 124, a shuttle valve 130, brake assemblies 108 attached to wheels/landing gear 106, and one or more brake pressure sensors 126, 136. In various embodiments, primary user input interface 112 is a pedal or other pilot actuator/interface for demanding braking during primary brake mode (landing, taxiing, etc.) while park user input interface 122 is a lever or other actuator/interface for demanding the application of a parking or emergency brake pressure during emergency/park mode, as described in greater detail below. These interfaces 112, 122 may be located in a cockpit of the aircraft 10 and may be manually actuated by a user/pilot to request or demand a desired braking force be applied at the wheels/landing gear 106.

In various embodiments, the primary user input interface 112 is coupled in electronic control communication with the primary valve assembly 114 via the hydraulic brake controller 105. That is, the hydraulic brake controller 105 may be configured to receive a braking request from the primary user input interface 112 and send a corresponding braking command to the primary valve assembly 114. The primary valve assembly 114, according to various embodiments, is an electronically actuated valve, such as a servo valve, that controls a hydraulic pressure to be delivered to the brake assembly 108 of the landing gear 106 via the shuttle valve 130. The brake assembly 108 may be coupled to landing gear 106 and may be disposed downstream of and in hydraulic communication with the shuttle valve 130. In various embodiments, the park user input interface 122 is mechanically or otherwise hardware linked to the park valve assembly 124 (e.g., a cable link physically extending between the park user input interface 122 and the park valve assembly 124). The park valve assembly 124, according to various embodiments, actuates an emergency hydraulic pressure to be delivered to the brake assembly 108 via the shuttle valve 130. As described in greater detail below, control of the hydraulic brake system 100 may be facilitated, at least in part, by using feedback from one or more pressure sensors 126, 136.

In various embodiments, the hydraulic brake controller 105 may include a plurality of channels (redundancy for safety purposes) and/or the hydraulic brake system 100 may include a plurality of interfaces 112, 122, a plurality of valve assemblies 114, 124, and a plurality of brake pressure sensors 126, 136 corresponding to a plurality of brake assemblies 108, such as inboard/outboard assemblies, right/left assemblies, etc.

The hydraulic brake controller 105 may be integrated into computer systems onboard aircraft 10 such as, for example, a brake control unit (BCU), a full authority digital engine control (FADEC), an engine-indicating and crew-alerting system (EICAS), and/or the like. The hydraulic brake controller 105 may also be a standalone computer system separate from aircraft 10 and in electronic communication with aircraft 10, as described in further detail herein. The hydraulic brake controller 105 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the hydraulic brake controller 105 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the hydraulic brake system 100 includes a first brake pressure sensor 136 and a second brake pressure sensor 126. The first brake pressure sensor 136 may be coupled to a first hydraulic line that extends between the shuttle valve 130 and the brake assembly 108. The second brake pressure sensor 126 may be coupled a second hydraulic line that extends between the park valve assembly 124 and the shuttle valve 130. According to various embodiments, the first brake pressure sensor 136 is configured to measure hydraulic pressure downstream of the shuttle valve 130 and downstream of a location where the second brake pressure sensor 126 measures hydraulic pressure. When both the first and second brake pressure sensors 136, 126 are fully operational/functional, the brake pressure sensors 136, 126 provide feedback to the hydraulic brake controller 105, and such feedback may be utilized by the hydraulic brake controller 105 to accomplish a desired braking force at the landing gear 106. However, in conventional brake control systems, brake pressure sensors are not prognostically monitored, and thus the sensors may be inaccurately reporting pressures, or the sensors may fail unexpectedly, which may result in inefficient or ineffective control of the braking system (non-optimal control of the braking system). Failure of the brake pressure sensors may also result in unexpected and unplanned inspections/repairs, which can cause flight delays and profit loss.

The hydraulic brake system 100 of the present disclosure, according to various embodiments, is configured to perform prognostics on the first brake pressure sensor 136 and the second brake pressure sensor 126 in order to monitor the status of such sensors 136, 126 and determine if the reported pressures are valid. That is, the hydraulic brake system 100 may further include a tangible, non-transitory memory configured to communicate with the processor of the controller 105. The tangible, non-transitory memory has instructions stored thereon that, in response to execution by the processor, cause the hydraulic brake system 100 to perform various operations, according to various embodiments.

Figure 4:
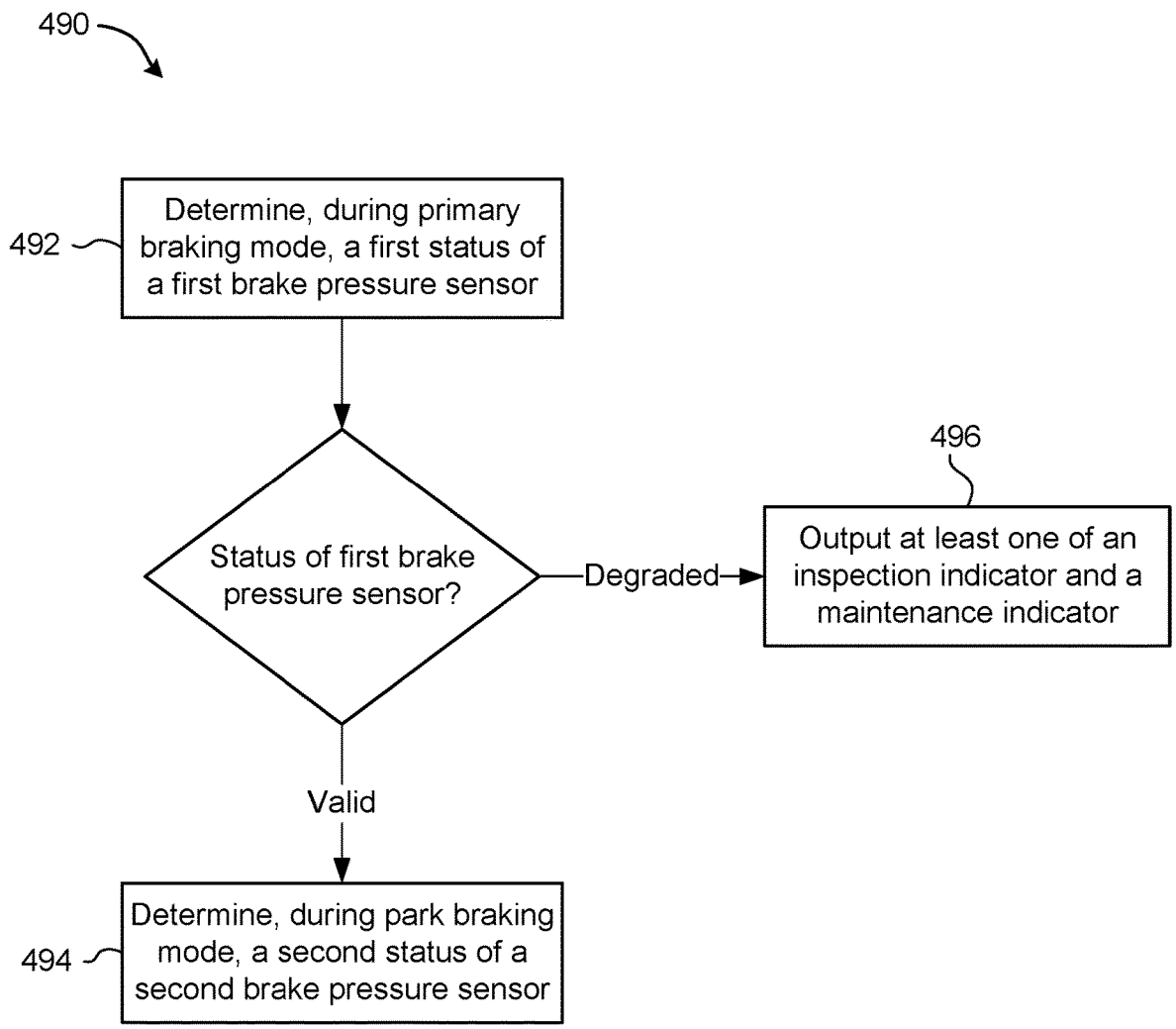
FIG. 4 is a schematic flow chart diagram of a method of performing prognostics on a hydraulic brake system of an aircraft, in accordance with various embodiments.

In various embodiments, and with reference to FIGS. 2 and 4, these operations are shown in method 490, which is a method of performing prognostics on the hydraulic brake system 100. More specifically, method 490 may include determining, during primary braking mode, a first status of the first brake pressure sensor 136 at step 492. Step 492 may include comparing, by the hydraulic brake controller 105, a reported pressure from the first brake pressure sensor 136 with an expected pressure. The expected pressure may be based on an electrical-current-to-pressure response of a servo valve of the primary valve assembly 114. That is, the electrical-current sent to the servo valve corresponds to a certain expected pressure, and if the reported pressure from the first brake pressure sensor 136 is different than the expected pressure, while operating in primary braking mode (i.e., not in parking mode or not in emergency braking mode), the hydraulic brake controller 105 is able to determine that the first brake pressure sensor 136 is faulty or degraded. If the status of the first brake pressure sensor 136 is degraded, the method 490 includes outputting, by the hydraulic brake controller 105, at least one of an inspection indicator and/or a maintenance/repair indicator at step 496. On the other hand, if the status of the first brake pressure sensor 136 is valid (or stated differently, if the determined status of the first brake pressure sensor 136 indicates that the detected/reported pressures are valid), the method 490 includes determining, during park braking mode and by the hydraulic brake controller 105, a second status of the second brake pressure sensor. That is, in response to confirming/validating the reported pressures received by the hydraulic brake controller 105 from the first brake pressure sensor 136, the prognostic method further includes relying on the confirmed/validated first pressure sensor 136 to test/check the validity of the hydraulic pressure reported by the second brake pressure sensor 126.

With the first brake pressure sensor 136 validated, and with the hydraulic brake system 100 operating in park mode, the first brake pressure sensor 136 and the second brake pressure sensor 126 should report the same hydraulic pressure, since both the first hydraulic line (to which the first brake pressure sensor 136 is coupled) and the second hydraulic line (to which the second brake pressure sensor 126 is coupled) are in fluidic communication via the shuttle valve. Accordingly, determining the second status of the second brake pressure sensor 126 may include monitoring to see if there is difference between the validated pressure from the first pressure sensor 136 and the reported pressure from the second brake pressure sensor 126. If there is a difference between the validated pressure of the first brake pressure sensor 136 and the reported pressure of the second brake pressure sensor 126 (i.e., if the second status of the second brake pressure sensor 126 is degraded), the method 490 may further include determining, by the hydraulic brake controller 105, an extent-of-degradation condition of the second brake pressure sensor 126. For example, the magnitude of the difference between the validated pressure of the first brake pressure sensor 136 and the reported pressure of the second brake pressure sensor 126 may be indicative or predictive of when the second brake pressure sensor 126 will fail. Accordingly, the detection of a degraded condition of the second brake pressure sensor 126 may indicate that the second brake pressure sensor 126 is beginning to fail, but the second brake pressure sensor 126 may still have useable life remaining, and thus inspection and/or repair of the failing (though not yet failed) second brake pressure sensor 126 may be conveniently scheduled to avoid flight delays and profit loss from a grounded aircraft.

In various embodiments, the hydraulic brake system 100 may continue to operate despite the second status of the second brake pressure sensor 126 being degraded. In various embodiments, the method 490 may further include determining, based on the extent-of-degradation condition, an expected timeline during which the aircraft will still be operational. In various embodiments, determining the extent-of-degradation condition includes determining a rate of change of the difference between the validated pressure from the first brake pressure sensor 136 and the reported pressure from the second brake pressure sensor 126.

Figure 3:
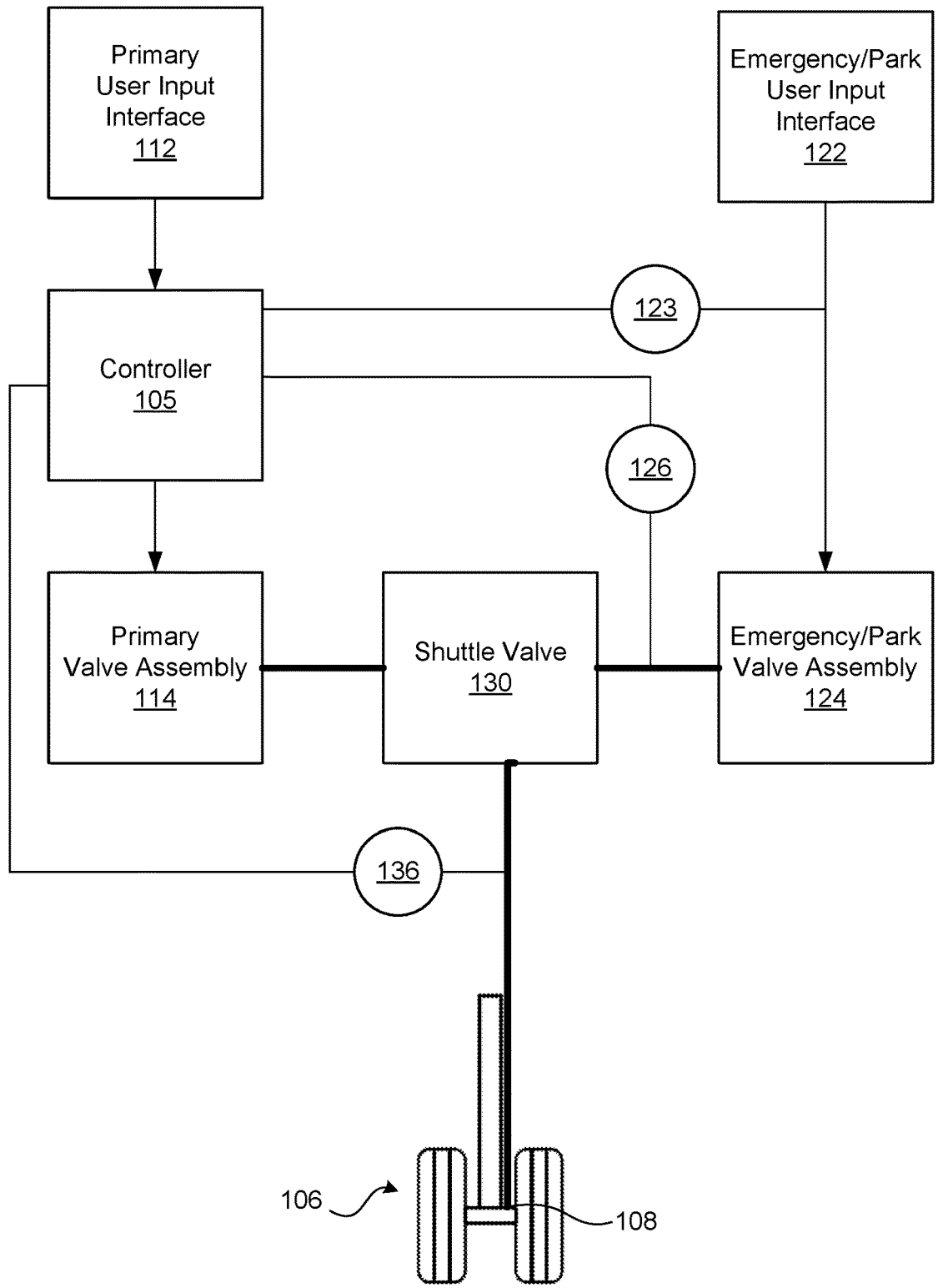
FIG. 3 illustrates another schematic of a hydraulic brake system, in accordance with various embodiments.
Figure 5:
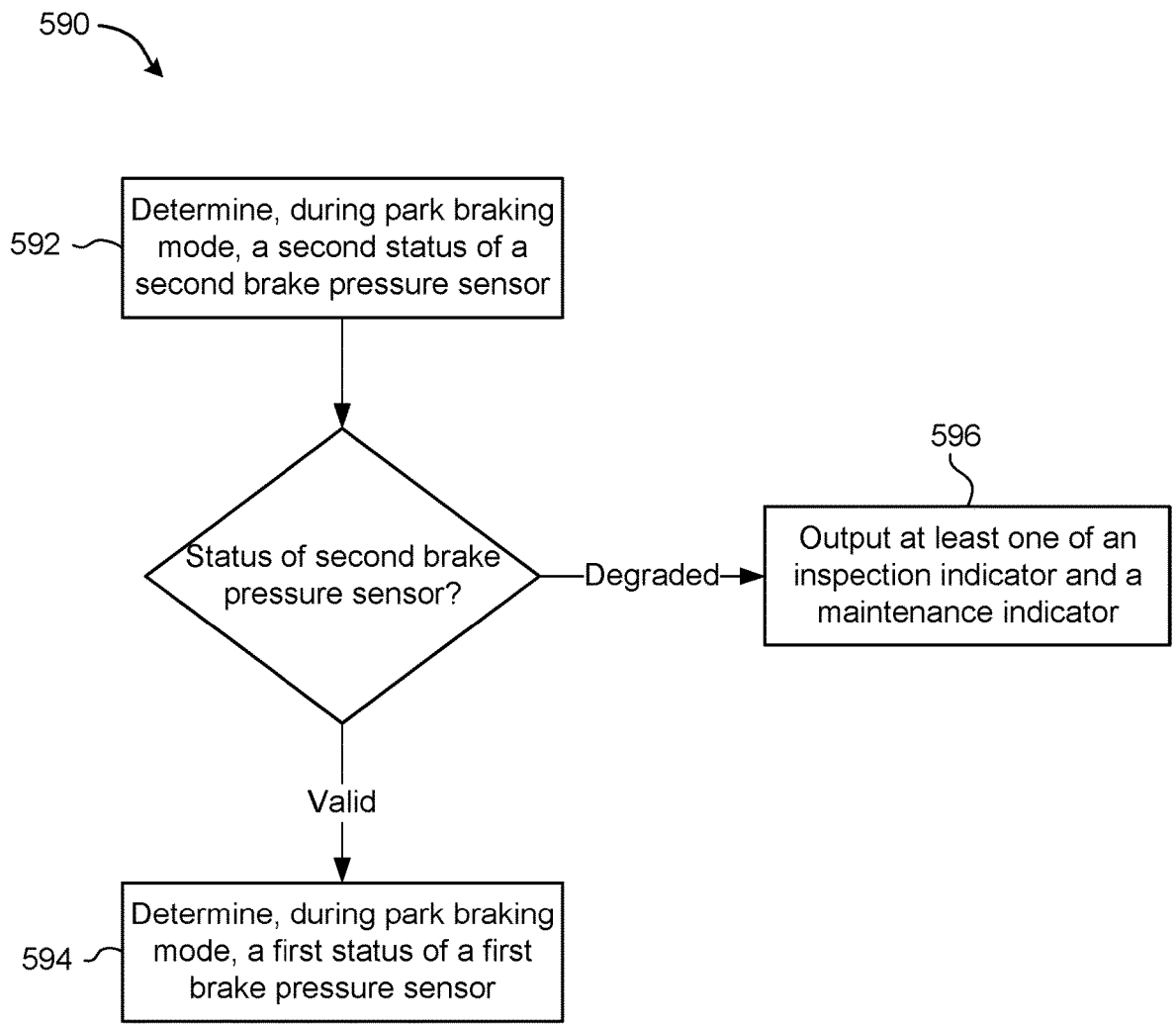
FIG. 5 is another schematic flow chart diagram of a method of performing prognostics on a hydraulic brake system of an aircraft, in accordance with various embodiments.

In various embodiments, and with reference to FIGS. 3 and 5, the hydraulic brake system 200 further includes a displacement sensor 123 operably coupled to the park user input interface 122. The hydraulic brake system 200 shown in FIG. 3 may be configured to perform the method 490 described above with reference to FIG. 4. The displacement sensor 123, according to various embodiments, detects the displacement of the park user input interface 122 from a neutral or "zero" position and communicates the detected signal to the controller 105. The displacement sensor 123 may include any suitable sensor, such as, for example, a linear variable differential transformer (LVDT), a rotary variable differential transformer (RVDT), a potentiometer, a magnetic encoder, and/or the like. The displacement sensor 123 may transmit the signal as a variable brake signal representative of the displacement of the park user input interface 122, which may be a percentage of displacement from a reference position to a maximum reference position.

In various embodiments, and with continued reference to FIGS. 3 and 5, method 590 includes first determining, during park brake mode and by the hydraulic brake controller 105, the second status of the second brake pressure sensor 126. That is, the second brake pressure sensor 126 may be monitored, during park brake mode, to determine if it is valid or degraded. This prognostic monitoring may include checking to determine if there is a difference between a reported pressure from the second brake pressure sensor 126 and the expected pressure based on the signal from the displacement sensor 123. That is, the expected pressure may be based on a position-to-pressure response indicated by the displacement sensor 123.

In response to determining that the second status of the second brake pressure sensor 126 is degraded, the method 590 may include outputting, by the hydraulic brake controller 105, at least one of an inspection indicator and a maintenance/repair indicator at step 596. On the other hand, in response to determining that the second status of the second brake pressure sensor 126 is valid, the method 590 may include determining, by the hydraulic brake controller 105 and during park braking mode, the first status of the first brake pressure sensor 136. In various embodiments, the hydraulic brake system 100 may rely on the displacement sensor 123 to validate the second brake pressure sensor 126, which can then be used to determine the status of the first brake pressure sensor 136.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of performing prognostics on a hydraulic brake system of an aircraft, the method comprising:
   determining, during primary braking mode and by a hydraulic brake controller, a first status of a first brake pressure sensor adjacent a brake assembly; and
   in response to determining that the first status of the first brake pressure sensor is valid, determining, during park braking mode and by the hydraulic brake controller, a second status of a second brake pressure sensor adjacent a park valve assembly.

2. The method of claim 1, wherein in response to determining that the first status of the first brake pressure sensor is degraded, the method further comprises outputting, by the hydraulic brake controller, at least one of an inspection indicator and a maintenance indicator.

3. The method of claim 1, wherein the first brake pressure sensor is coupled to a first hydraulic line extending between a shuttle valve and the brake assembly.

4. The method of claim 3, wherein the second brake pressure sensor is upstream of the shuttle valve.

5. The method of claim 3, wherein the second brake pressure sensor is coupled to a second hydraulic line extending between the park valve assembly and the shuttle valve.

6. The method of claim 5, wherein in response to determining that the second status of the second brake pressure sensor is degraded, the method comprises determining, by the hydraulic brake controller, an extent-of-degradation condition of the second brake pressure sensor.

7. The method of claim 6, wherein the extent-of-degradation condition is predictive of when the second brake pressure sensor will fail.

8. The method of claim 6, further comprising determining, based on the extent-of-degradation condition and by the hydraulic brake controller, a timeline for at least one of inspecting and performing maintenance on the second brake pressure sensor.

9. The method of claim 6, wherein the determining the extent-of-degradation condition comprises comparing a difference between a validated pressure from the first pressure sensor and a reported pressure from the second brake pressure sensor.

10. The method of claim 9, wherein the determining the extent-of-degradation condition comprises determining a rate of change of the difference between the validated pressure from the first pressure sensor and the reported pressure from the second brake pressure sensor.

11. The method of claim 1, wherein determining the first status of the first brake pressure sensor comprises comparing, by the hydraulic brake controller, a reported pressure from the first brake pressure sensor with an expected pressure.

12. The method of claim 11, wherein the expected pressure is based on an electrical-current-to-pressure response of a servo valve.

13. A hydraulic brake system for an aircraft, the hydraulic brake system comprising:
    a primary user input interface;
    a primary valve assembly in electronic control communication with the primary user input interface via a hydraulic brake controller;
    a park user input interface;
    a park valve assembly in mechanical control communication with the park user input interface;
    a shuttle valve disposed in hydraulic communication between the primary valve assembly and the park valve assembly;
    a brake assembly coupled to landing gear of the aircraft and disposed downstream of and in hydraulic communication with the shuttle valve;
    a first brake pressure sensor coupled between the shuttle valve and the brake assembly;
    a second brake pressure sensor coupled between the park valve assembly and the shuttle valve;
    the hydraulic brake controller having a processor; and
    a tangible, non-transitory memory configured to communicate with the processor, the tangible, non-transitory memory having instructions stored thereon that, in response to execution by the processor, cause the hydraulic brake system to perform operations comprising:
        determining, by the processor and during primary braking mode, a first status of the first brake pressure sensor; and
        in response to determining that the first status of the first brake pressure sensor is valid, determining, by the processor and during park braking mode, a second status of the second brake pressure sensor.

14. The hydraulic brake system of claim 13, further comprising a displacement sensor operably coupled to the park user input interface.

15. The hydraulic brake system of claim 14, wherein the tangible, non-transitory memory, in response to execution by the processor, is configured to cause the hydraulic brake system to perform operations comprising:
    determining, during the park braking mode and by the hydraulic brake controller, the second status of the second brake pressure sensor that is coupled to a second hydraulic line extending between the park valve assembly and the shuttle valve; and
    in response to determining that the second status of the second brake pressure sensor is valid, determining, during the park braking mode and by the hydraulic brake controller, the first status of the first brake pressure sensor that is coupled to a first hydraulic line extending between the shuttle valve and the brake assembly.

16. A method of performing prognostics on a hydraulic brake system of an aircraft, the method comprising:
- determining, during park braking mode and by a hydraulic brake controller, a second status of a second brake pressure sensor that is coupled to a second hydraulic line extending between a park valve assembly and a shuttle valve; and
- in response to determining that the second status of the second brake pressure sensor is valid, determining, during park braking mode and by the hydraulic brake controller, a first status of a first brake pressure sensor that is coupled to a first hydraulic line extending between the shuttle valve and a brake assembly.

17. The method of claim 16, wherein determining the second status of the second brake pressure sensor comprises comparing, by the hydraulic brake controller, a reported pressure from the second brake pressure sensor with an expected pressure, wherein the expected pressure is based on a position-to-pressure response of a displacement sensor.

18. The method of claim 17, wherein in response to determining that the second status of the second brake pressure sensor is degraded, the method comprises outputting, by the hydraulic brake controller, at least one of an inspection indicator and a maintenance indicator.

19. The method of claim 17, wherein in response to determining that the first status of the first brake pressure sensor is degraded, the method comprises determining, by the hydraulic brake controller, an extent-of-degradation condition of the first brake pressure sensor.

20. The method of claim 19, wherein the extent-of-degradation condition is predictive of when the first brake pressure sensor will fail.

* * * * *